Sept. 29, 1959 R. RABIN ET AL 2,906,997
HIGH-SPEED REDUNDANCY CHECK GENERATOR
Filed Sept. 18, 1957
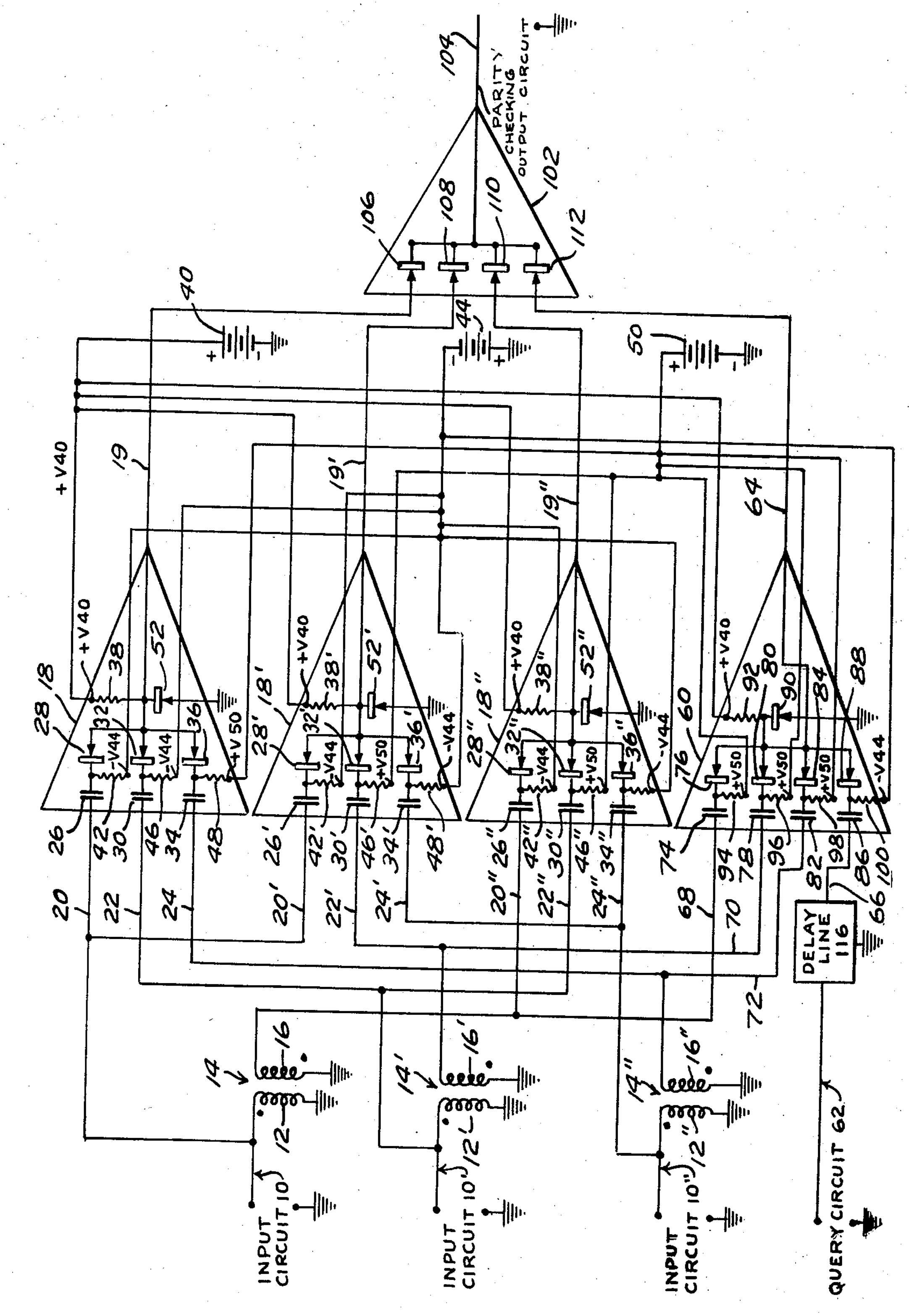

United States Patent Office 2,906,997
Patented Sept. 29, 1959

2,906,997

HIGH SPEED REDUNDANCY CHECK GENERATOR

Richard Rabin, Stamford, Conn., and Kurt Merl, Bronx, N.Y., assignors to Sperry Rand Corporation, Ford Instrument Company Division, Long Island City, N.Y., a corporation of Delaware Application September 18, 1957, Serial No. 685,777

9 Claims. (Cl. 340—149)

This invention relates to digital data processing systems and more particularly to networks for detecting the erroneous omission or addition of pulses in coded trains of pulses as a result of data processing operations.

As contemplated by the invention, the available train of information coded pulses as provided by a data source having individual circuits for each of the digits in the code is divided into subgroups, thereby effecting parallel transmission of information. Gating networks are provided for receiving the pulses from each subgroup and generating a single pulse indicative of whether the number of pulses in each subgroup is odd or even, the single pulse being available for a parity check of the number of pulses in the same subgroup at a later stage in the data processing. In general the gating networks include diodes which are biased by D.C. voltage sources, the biased states being changed by the odd or even combination of pulses in the subgroup. For generating an informational pulse indicative of no pulses (or all zeroes), in a subgroup, a gate circuit adapted to receive signals from the subgroup also receives a query pulse, the gate circuit being designed to conduct the query pulse to a blank signal output circuit only when the subgroup is void of any signal.

A principal object of this invention is to provide a new network for generating additional pulses representative of the number of pulses in a subgroup of a coded train of pulses, the additional pulses being available for checking the parity of the subgroups within coded trains of pulses at any stage of data processing.

These and other features, capabilities and advantages of the invention will appear from the following detailed description of one embodiment thereof illustrated in the accompanying drawing in which:

The drawing is a schematic representation of components and their interconnections for practicing the invention.

Referring to the drawing, the components of the invention are illustrated as including input circuits 10, 10′ and 10″, each circuit being adapted to have impressed thereon the individual pulses of a three digit subgroup within a digital coded train of pulses, it being understood that a three digit subgroup is representative of a convenient subgroup size. The input circuits 10, 10′ and 10″ are terminated in the input windings 12, 12′ and 12″ of transformers 14, 14′ and 14″, respectively, one side of each of the input circuits being grounded. One side of secondary windings 16, 16′ and 16″ of the transformers 14, 14′ and 14″, respectively, is connected to ground and these windings are sensed to reverse the polarity of signals in the input circuits coupled thereto.

A gate 18 is provided to yield a signal to an output conductor 19 when signals are concurrently present on the input circuits 10 and 10′ in combination with the absence of a signal on the input circuit 10″. The gate 18 is connected at its input side to the ungrounded conductors of the input circuit 10, the input circuit 10′ and the secondary winding 16″ by conductors 20, 22 and 24, respectively.

A gate 18′ is provided to yield a signal to an output conductor 19′ when signals are concurrently present on the input circuits 10 and 10″ in combination with the absence of a signal on the input circuit 10′. The gate 18′ is connected at its input side to the ungrounded conductors of the input circuit 10, the input circuit 10″ and the secondary winding 16′ by conductors 20′, 22′, and 24″, respectively.

A gate 18″ is provided to yield a signal to an output conductor 19″ when signals are concurrently present on the input circuits 10′ and 10″ in combination with the absence of a signal on the input circuit 10. The gate 18″ is connected at its input side to the ungrounded conductors of the secondary winding 18, the input circuit 10′ and the input circuit 10″ by conductors 20″, 22″ and 24″ respectively.

The gate 18 has a condenser 26 in series connection with a diode 28 between the conductor 20 and the output conductor 19, a condenser 30 in series connection with a diode 32 between the conductor 22 and the output conductor 19, as well as a condenser 34 in series connection with a diode 36 between the conductor 24 and the output conductor 19.

A resistor 38 is connected between the output conductor 19 and a positive side of a D.C. voltage source 40 having its negative side grounded. A resistor 42 is connected to the junction of the condenser 26 and the diode 28 and to the negative side of a D.C. voltage source 44 which has its positive side grounded. Also a resistor 46 is connected to the junction of the condenser 30 and the diode 32 and the negative side of the source 44. Additionally, a resistor 48 is connected to the junction of the condenser 34 and the diode 36 and to the positive side of a D.C. source 50 having its negative side grounded. A clamping diode 52 is connected and poled from ground to the conductor 19, the diodes 28, 32 and 36 being poled away from the conductor 19. It is to be noted that source 44 is coupled to the conductor at the input side of the gate 18 which are connected directly to the input circuits, while the source 50 is coupled to the conductor which is connected to the secondary of one of the transformers. Gates 18′ and 18″ have similar components and connections to those of the gate 18 and the corresponding elements in the drawing have the same reference characters as the elements for the gate 18 with additions of prime suffixes and double prime suffixes, respectively. The source 50 is coupled to one side of condenser 34 on conductor 22′ for the gate 18′ and to one side of condenser 30″ on conductor 22″ for the gate 18″.

A gate 60 is provided to conduct a signal from a query circuit 62 to a blank code output conductor 64 when no signals are present on input circuits 10, 10′ and 10″, the intermittant energization of the query circuit being effected by equipment now shown. The gate 60 is connected at its input side to the ungrounded conductors of the query circuit 62 and to the secondary windings 16, 16′ and 16″ by conductors 66, 68, 70 and 72, respectively.

Gate 60 has a condenser 74 in series connection with a diode 76 between the conductors 68 and 64, a condenser 78 in series connection with a diode 80 between the conductors 70 and 64, a condenser 82 in series connection with a diode 84 between the conductors 72 and 64 and a condenser 86 in series connection with a diode 88 between the conductors 66 and 64. Diodes 76, 80, 84 and 88 are poled away from the conductor 64 and a clamping diode 90 is provided and poled from ground to the conductor 64.

A resistor 92 is connected between the blank code output conductor 64 and the positive side of the D.C. source 40. A resistor 94 is connected from the junction of the condenser 74 and the diode 76 to the positive side of the D.C. source 50, a resistor 96 is connected from the junction of the condenser 78 and the diode 80 to the positive side of the D.C. source 50, a resistor 98 is connected from the junction of the condenser 82 and the diode 84 to the positive side of the D.C. source 50 and a resistor 100 is connected from the junction of the condenser 86 and the diode 88 to the negative side of the D.C. source 44.

An "or" gate or summing network 102 is connected at its input side to the output conductors 19, 19′ and 19″ and 64 for conducting any output pulses from either gates 18, 18′, 18″ or 60 to a parity checking circuit 104. Gate 102 includes diodes 106, 108, 110 and 112 connected and poled respectively from the conductors 19, 19′ and 19″ and 64 to the ungrounded conductor of the parity checking output circuit 104.

According to one embodiment of the invention as disclosed in the drawing, an even number of simultaneous pulses on the three input circuits 10, 10′ and 10″ will generate a pulse in the parity checking circuit 104 while an odd number of simultaneous pulses on the input circuits will present any output pulse from appearing on the parity checking circuit. With the respresentation of simultaneously existing pulses in the input circuits 10, 10′ and 10″ of A, B and C, respectively, and the simultaneous lack of pulses in these input circuits as A′, B′ and C′, respectively, any one of four conditions ABC′, AB′C, BA′C or A′B′C′ corresponds to an even number of pulses in the input circuits which should generate a pulse in the parity checking circuit 104. Also, any one of the four conditions AB′C′, A′BC′, A′B′C or ABC should prevent the generation of a pulse in the parity checking circuit 104. In the drawing, pulse condition ABC′ will yield a pulse from the gate 18, pulse condition AB′C will yield a pulse from the gate 18′, pulse condition BA′C will yield a pulse from the gate 18″ and pulse condition A′B′C′ will yield a pulse from the gate 60.

In gate 60, by selectively making the voltage of the source 44 equal to the voltage of the source 40, the voltage of the source 50 smaller than that of the source 40, the resistive value of the resistor 100 smaller than that of the resistor 92, the clamping diode 90 and the diode 88 become conductive so as to establish the potential of the blank code output circuit conductor 64 at substantially zero level. Diodes 76, 80 and 84 are then reversed biased by the positive potential of the D.C. source 50. If a positive pulse of amplitude greater than that of source 50 should appear on the query circuit 62, the diode 88 will be cut off and the potential of the conductor 64 will begin to rise toward the positive potential of the source 40 with a time constant of the resistor 92 and the stray wiring capacity of the output circuitry. The limitation on the rate of voltage rise on the output circuitry is such that under ideal conditions (no stray capacitance) it will follow the slowest rise of the input pulses. However, due to the comparatively low reverse bias on the diodes 76, 80 and 84, the rise of potential of the output conductor 64 is limited to the voltage of the source 50. Thereafter, the output pulse will remain at the voltage of the source 50 until the query pulse drops off. If a negative pulse appears at any of the secondary windings 16, 16′ and 16″ of sufficient amplitude to overcome the positive voltage of the source 50, and is of low enough impedance in comparison to the resistor 92 to force its associated diode into the conducting region, then the potential of the blank output circuit conductor 64 cannot rise regardless of whether a pulse is present or absent on the query circuit 62. Hence, the arrival of a negative pulse from any of the transformer secondaries 16, 16′ and 16″ will inhibit the output of the gate 60. In the absence of a pulse on either of the input circuits 10, 10′ or 10″, the query pulse from the circuit 62 is conducted to the blank code output circuit 64 via gate 60 and the parity checking circuit 104 so as to satisfy the pulse condition A′B′C′. Due to the slight delays encountered by the digit pulses, it may be necessary to include a delay line 116 between the query circuit 62 and the gate 60 for eliminating high frequency spikes from leaking through the gate.

In gate 18, the resistors 42 and 46 are selected to have a smaller resistive value than the resistor 38 for forward biasing the diodes 52, 28 and 32. The resistor 48 is selected to have a resistive value such as to reverse bias the diode 36. Hence, the potential of the output conductor 19 is clamped to zero potential by the diode 52 for no input pulses to the gate 18. While a positive pulse from the input circuit 10 will cut off the diode 28 and a positive pulse from the input circuit 10′ will cut off the diode 32, the clamping diode 52 will not be cut off and yield a pulse to the parity check output circuit 104 unless both the diodes 28 and 32 are cut off simultaneously while the diode 36 remains reversed biased. Since a negative pulse from the secondary winding 16″ will forward bias the diode 36, gate 18 functions to satisfy the requirement for generating a pulse under pulse condition ABC′.

Gates 18′ and 18″ function in a manner similar to that of the gate 18. Simultaneous signals in the input circuit 10 and 10″ in combination with the absence of a signal from the input circuit 10′ will reverse bias the diodes 28′ and 36′ while maintaining the reverse bias of the diode 32′ for effecting a reverse biasing of the clamping diode 52′. Hence signal condition AB′C will oblige the gate 18′ to generate a pulse for the parity checking circuit 104. Also, simultaneous signals in the input circuit 10′ and 10″ in combination with the absence of a signal from the input circuit 10 will reverse bias the diodes 32″ and 36″ while maintaining the reverse bias on the diode 28″ for effecting a reverse biasing of the clamping diode 52″. Hence, signal condition BA′C will oblige the gate 18″ to generate a pulse for the parity checking circuit 104.

It is to be understood that various modifications of the invention other than those above described may be effected by persons skilled in the art without departing from the principle and scope of the invention as defined in the appended claims.

What is claimed is:

1. In a parity checking system for determining the odd or even order of a plurality of digital signals in a subgroup of parallel generated digital coded signals, circuit means comprising a plurality of input circuits, each of the input circuits being adapted to receive signals representing one digit of said subgroup, a plurality of signal inverting devices, one of said devices being connected to each of the said input circuits for providing a signal indicative of the presence of a signal in the input circuit connected thereto, a plurality of gates, each of said gates being connected at its input side to the output side of a signal inverting device for one of said input circuits and also directly to the other input circuits, an output circuit connected to the output side of each of said gates, another input circuit adapted to receive signals, another gate connected to said other input circuit and having an other output circuit, said other gate being connected to each of said devices for conducting signals from the said other input circuit to said other output circuit when the signals from all of the said first means is zero.

2. Circuit means as claimed in claim 1 in which there is provided a mixing network connected at its input side to each of said output circuits and said other output circuit, and an output circuit connected to said mixing network.

3. Circuit means as claimed in claim 2 wherein said mixing network is an "or" gate.

4. Circuit means as claimed in claim 3 wherein said mixing network includes a first unidirectional device connected between said parity checking circuit and said other output circuit and a second unidirectional device connected between the output circuit of said mixing network and each of said output circuits.

5. Circuit means as claimed in claim 1 in which said signal inverting devices are transformers.

6. Circuit means as claimed in claim 1 in which each of said plurality of gates includes a first diode connected between its output circuit and one of each of the input circuits connected thereto, a second diode connected between its output circuit and the first means connected thereto, means for reverse biasing the said second diode, means for forward biasing each of said first diodes, a clamping diode connected across its output circuit, means for forward biasing said clamping diode, means for removing the reverse bias from the said second diode by a signal from the first means connected thereto, means for removing the forward bias from each of the said first diodes by a signal in the input circuit connected thereto, means for removing the forward bias from said clamping diode when all the said first diodes are reversed biased and the said second diode is reversed biased, a voltage source, and means connecting said voltage source to its output circuit for applying a voltage thereto when said clamping diode is reversed biased.

7. Circuit means as claimed in claim 1 wherein each of the said plurality of gates comprises a first condenser and a first diode serially connected between its output circuit and each of the input circuits connected thereto, a second condenser and a second diode serially connected between its output circuit and the first means connected thereto, a first and a second direct current voltage source having their negative sides connected to the other side of said output circuit, a third direct current voltage source having its positive side connected to the negative sides of said first and second direct current voltage sources, a first resistor connected between the positive side of said first source and the said one side of said output circuit, a second resistor connected between the positive side of said second direct current voltage source and the junction of said second condenser and said second diode, a third resistor connected between the negative side of said third direct current voltage source and each of the junctions of said first condensers and said first diodes, and a clamping diode connected across the said output circuit, said first and second diodes being poled away from their output circuit and said clamping diode being poled toward said one side of said output circuit.

8. Circuit means as claimed in claim 1 in which said other gate includes a first diode connected between the said other output circuit and the said other input circuit, a second diode connected to the said other output circuit and one of each of the said first means, means for forward biasing said first diode, means for reverse biasing each of the said second diodes, a clamping diode connected across the said other output circuit, means for forward biasing said clamping diode, means for removing the forward bias from said first diode by a signal in the said other input circuit, means for removing the reverse bias from each of the said second diodes by a signal from the first means connected thereto, means for removing the forward bias from said clamping diode when none of the said second diodes are forward biased and said first diode is reversed biased, a voltage source, and means connecting said voltage source to the said other output circuit for applying a voltage thereto when said clamping diode is reversed biased.

9. Circuit means as claimed in claim 1 wherein said other gate comprises a first condenser and a first diode serially connected between one side of the said other output circuit and one side of the said query circuit, a second condenser and second diode serially connected between said one side of said other output circuit and each of the said devices, a first and second direct current voltage source having their negative sides connected to the other side of said other output circuit, a first resistor connected between the positive side of said first direct current voltage source and said one side of said other output circuit, a second resistor connected between the positive side of said second direct current voltage source and each junction of the said second condenser a second diode series combination, a third direct current voltage source, a third resistor connected between the negative side of said third source and the junction of said first condenser and said first diode and a clamping diode connected across said other output circuit, said first and second diodes being poled away from said one side of said other output circuit and said clamping diode being poled toward said one side of said other output circuit.

References Cited in the file of this patent

UNITED STATES PATENTS

| | | |
|---|---|---|
| 2,675,538 | Malthaner | Apr. 13, 1954 |
| 2,719,959 | Hobbs | Oct. 4, 1955 |
| 2,724,739 | Harris | Nov. 22, 1955 |